United States Patent
Bjorck et al.

(10) Patent No.: US 8,117,932 B2
(45) Date of Patent: Feb. 21, 2012

(54) MULTI-SPEED TRANSMISSION WITH COUNTERSHAFT GEARING

(75) Inventors: Per-Gunnar Bjorck, Trollhattan (SE); Mikael Mohlin, Kungalv (SE); John A. Diemer, Farmington Hills, MI (US); James D. Hendrickson, Belleville, MI (US); Patrick S. Portell, Plymouth, MI (US); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 636 days.

(21) Appl. No.: 11/952,345

(22) Filed: Dec. 7, 2007

(65) Prior Publication Data
US 2008/0161154 A1  Jul. 3, 2008

Related U.S. Application Data

(60) Provisional application No. 60/878,318, filed on Jan. 3, 2007.

(51) Int. Cl.
*F16H 3/08* (2006.01)

(52) U.S. Cl. .......................................... 74/329; 74/330

(58) Field of Classification Search ................... 74/329, 74/330, 340, 331
See application file for complete search history.

(56) References Cited

U.S. PATENT DOCUMENTS

| | | | |
|---|---|---|---|
| 7,155,994 B2 * | 1/2007 | Gumpoltsberger | 74/340 |
| 7,500,411 B2 * | 3/2009 | Gumpoltsberger | 74/329 |
| 2004/0093972 A1 * | 5/2004 | Gumpoltsberger et al. | 74/325 |
| 2005/0103140 A1 | 5/2005 | Gumpoltsberger | |
| 2006/0169076 A1 * | 8/2006 | Gumpoltsberger et al. | 74/330 |
| 2008/0134817 A1 * | 6/2008 | Bjorck et al. | 74/330 |
| 2008/0141808 A1 * | 6/2008 | Gumpoltsberger | 74/340 |

FOREIGN PATENT DOCUMENTS
DE  10253259 A1  5/2004
* cited by examiner

*Primary Examiner* — Roger Pang

(57) ABSTRACT

A transmission is provided having an input member, an output member, a dual clutch assembly, a countershaft, a plurality of co-planar gear sets, a plurality of interconnecting members, and a plurality of torque transmitting devices. The torque transmitting devices include synchronizer assemblies. The output shaft is connected to a final drive unit that has a final drive unit output shaft that is transverse to an input member connected at one end to a torque converter and at the other end to the dual clutch.

22 Claims, 2 Drawing Sheets

MULTI-SPEED TRANSMISSION WITH COUNTERSHAFT GEARING

CROSS-REFERENCE TO RELATED APPLICATIONS

This application claims the benefit of U.S. Provisional Application No. 60/878,318, filed on Jan. 3, 2007. The disclosure of the above application is incorporated herein by reference.

TECHNICAL FIELD

The present disclosure relates to transmissions, and more particularly to a multiple speed transmission having a dual clutch assembly and a countershaft.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

The addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY

The present invention provides a transmission having an input member, an output member, a dual clutch assembly, a countershaft, a plurality of co-planar gear sets, a plurality of interconnecting members, and a plurality of torque transmitting devices. The torque transmitting devices include synchronizer assemblies.

One embodiment of the transmission of the present invention includes an input member, an output member, a first, second, third, fourth, fifth, sixth, seventh, and eighth gear set each having a first gear and a second gear, wherein the output member is continuously connected with one of the gear sets, a first interconnecting member continuously connected to the fifth and sixth gear sets, a second interconnecting member continuously connected with the third and fourth gear sets, a countershaft continuously connected to the first, second, seventh, and eighth gear sets, a dual clutch assembly selectively engageable to interconnect the input member with one of the first interconnecting member and the second interconnecting member, and four synchronizer assemblies for selectively coupling one of the first, second, third, fourth, fifth, sixth, seventh, and eighth gear sets with one of the first interconnecting member, second interconnecting member, and the countershaft. The dual clutch assembly and four synchronizer assemblies are selectively engageable in combinations of at least two to establish at least seven forward speed ratios and at least one reverse speed ratio between the input member and the output member.

In one aspect of the present invention, the countershaft is located radially outward from and parallel to the input member.

In another aspect of the present invention, the output member is located radially outward from and parallel to the input member.

In yet another aspect of the present invention, the first interconnecting member is concentric with the second interconnecting member.

In yet another aspect of the present invention, a torque converter is connected with the input member and a transfer case is connected with the output member, wherein the transfer case is connected to a transfer case output member located between the torque converter and the dual clutch assembly.

In yet another aspect of the present invention, the dual clutch assembly includes a first clutch for selectively connecting the input member with the first interconnecting member and a second clutch for selectively connecting the input member with the second interconnecting member.

In yet another aspect of the present invention, the output member is continuously connected with the second gear set.

In yet another aspect of the present invention, the first gear and second gear within each of the first, second, third, fourth, fifth, sixth, seventh, and eighth gear sets are radially aligned.

In yet another aspect of the present invention, the fifth gear set includes a third gear rotatable about an axis radially outward from and parallel to the countershaft, and wherein the third gear is intermeshed with the first gear and the second gear of the fifth gear set.

In yet another aspect of the present invention, the second gear set includes a third gear continuously connected to the output member.

In yet another aspect of the present invention, the first, second, and third gears of the second and fifth gear sets are radially aligned.

In yet another aspect of the present invention, a first of the four synchronizer assemblies selectively connects one of the first gear set and the second gear set to the second interconnecting member.

In yet another aspect of the present invention, a second of the four synchronizer assemblies selectively connects one of the third gear set and the fourth gear set to the countershaft.

In yet another aspect of the present invention, a third of the four synchronizer assemblies selectively connects one of the fifth gear set and the sixth gear set to the countershaft.

In yet another aspect of the present invention, a fourth of the four synchronizer assemblies selectively connects one of the seventh gear set and the eighth gear set to the first interconnecting member.

In yet another aspect of the present invention, the first gears are connectable with at least one of the first interconnecting member and the second interconnecting member and wherein the second gears are connectable with the countershaft.

In yet another aspect of the present invention, the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set.

Another embodiment of the transmission of the present invention includes an input member, an output member, a first, second, third, fourth, fifth, sixth, seventh, and eighth gear set each having a first gear and a second gear, wherein the output member is continuously connected with the fifth gear set, a first interconnecting member continuously connected to the seventh and eighth gear sets, a second interconnecting member continuously connected with the third and fourth gear sets, a countershaft continuously connected to the first, second, fifth, and sixth gear sets, a dual clutch assembly having a first clutch for selectively connecting the input member with the first interconnecting member and a second clutch for selectively connecting the input member with the second interconnecting member, a first synchronizer assembly for selectively connecting one of the first gear set and the second gear set to the second interconnecting member, a second synchronizer assembly for selectively connecting one of the third gear set and the fourth gear set to the countershaft, a third synchronizer assembly for selectively connecting one of the fifth gear set and the sixth gear set to the first interconnecting member, and a fourth synchronizer assembly for selectively connecting one of the seventh gear set and the eighth gear set to the countershaft. The first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set. The dual clutch assembly and four synchronizer assemblies are selectively engageable in combinations of at least two to establish at least seven forward speed ratios and at least one reverse speed ratio between the input member and the output member.

The above features and advantages and other features and advantages of the present invention are readily apparent from the following detailed description of the best modes for carrying out the invention when taken in connection with the accompanying drawings.

DESCRIPTION

Figure 1:
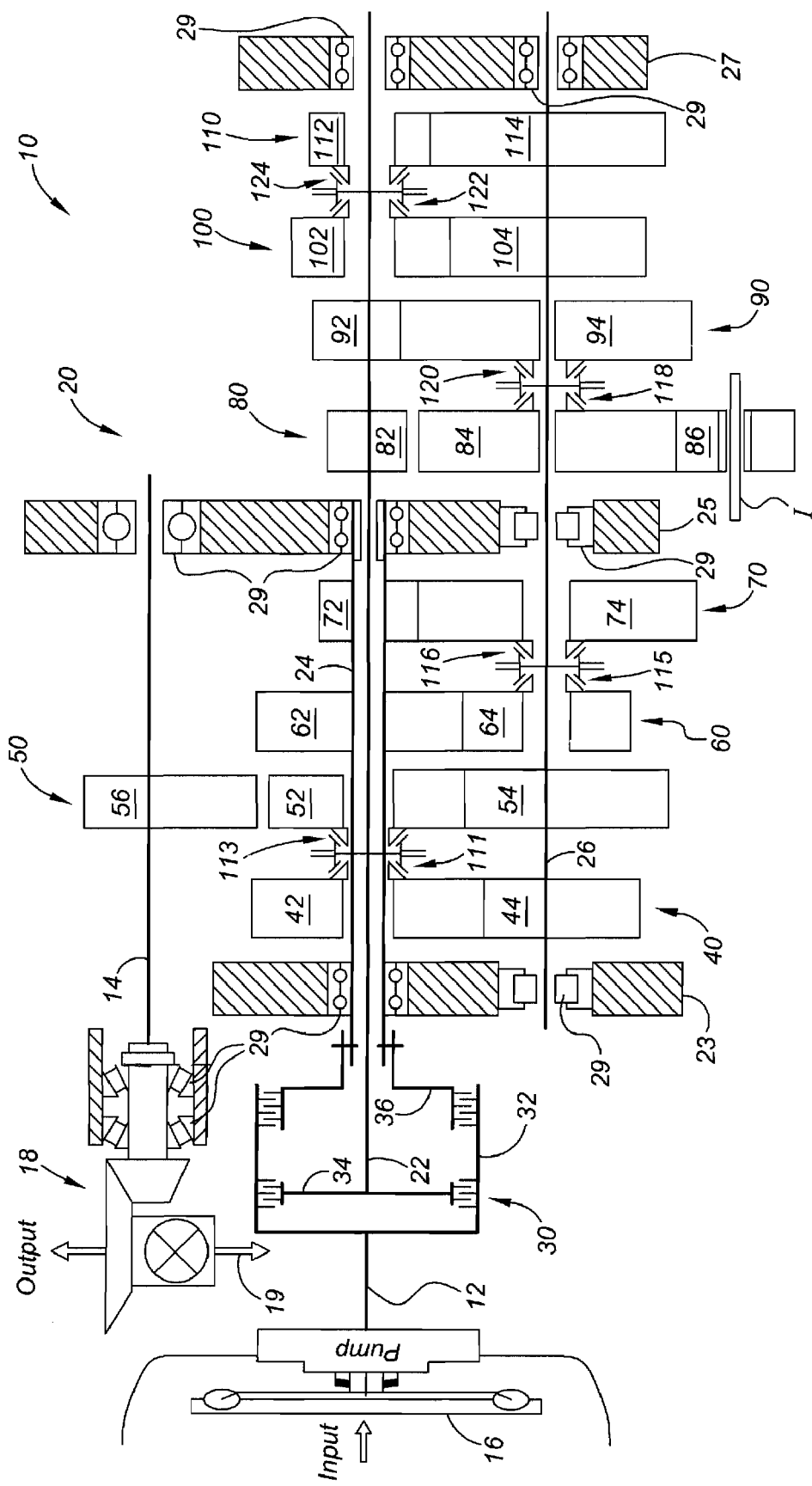
FIG. 1 is a diagram of an embodiment of a multiple speed transmission according to the principles of the present invention.

Referring to the drawings, wherein like reference numbers refer to like components, in FIG. 1 a multi-speed transmission 10 is depicted. The transmission 10 includes an input member 12 and an output member 14. In the present embodiment, the input member 12 and the output member 14 are shafts, however it should be appreciated that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The final drive unit 18 includes a final drive unit output shaft 19 that is transverse to input member 12. The transmission 10 includes a countershaft gearing arrangement 20 that includes interconnecting shafts, a countershaft, radially aligned or co-planar intermeshing gear sets and selectively engageable synchronizers as will be described herein. For example, the countershaft gearing arrangement 20 includes a first interconnecting shaft 22 and a second interconnecting shaft 24, which is a sleeve shaft concentric with the first interconnecting shaft 22. The countershaft gearing arrangement 20 further includes a countershaft 26. The countershaft 26 is both spaced from and parallel with the input shaft 12, the output shaft 14 and the interconnecting shafts 22, 24.

The first and second interconnecting shafts 22, 24, countershaft 26 and output shaft 14 are supported by a first, second and third support structure or wall 23, 25, 27 formed in the housing of transmission 10. As conventionally known, the walls 23, 25, 27 are fitted with bearings 29 for rotatably supporting the first and second interconnecting shafts 22, 24, countershaft 26 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second interconnecting shafts 22, 24 and is located adjacent output shaft 19. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32 connects the input shaft 12 for common rotation with first interconnecting shaft 22 and selective engagement of clutch element 36 with clutch housing 32 connects the input shaft 12 for common rotation with second interconnecting shaft 24.

The countershaft gearing arrangement 20 also includes co-planar, intermeshing gear sets 40, 50, 60, 70, 80, 90, 100 and 110. Gear set 40 includes co-planar, intermeshing gear 42 and gear 44. Gear 42 is selectively connectable for common rotation with second interconnecting shaft 24 and intermeshes with gear 44. Gear 44 is connected for common rotation with countershaft 26. As shown in FIG. 1, gear set 40 is disposed adjacent wall 23 and provides a seventh gear ratio.

Gear set 50 includes co-planar, intermeshing gear 52, gear 54, and gear 56. Gear 52 is selectively connectable for common rotation with second interconnecting shaft 24 and intermeshes with gear 54. Gear 54 is connected for common rotation with countershaft 26 and intermeshes with gear 56. Gear 56 is connected for common rotation with output shaft 14. Gears 54 and 56 are called transfer gears. As shown in FIG. 1, gear set 50 is disposed adjacent gear set 40 and provides a third gear ratio.

Gear set 60 includes co-planar, intermeshing gear 62 and gear 64. Gear 62 is connected for common rotation with second interconnecting shaft 24 and intermeshes with gear 64. Gear 64 is selectively connectable with countershaft 26. As shown in FIG. 1, gear set 60 is disposed adjacent gear set 50 and provides a fifth gear ratio.

Gear set 70 includes co-planar, intermeshing gear 72 and gear 74. Gear 72 is connected for common rotation with second interconnecting shaft 24 and intermeshes with gear 74. Gear 74 is selectively connectable for common rotation with countershaft 26. As shown in FIG. 1, gear set 70 is disposed adjacent gear set 60 and adjacent wall 25 and provides a first gear ratio.

Gear set 80 includes co-planar, intermeshing gear 82, gear 84 and idler gear 86. Gear 82 is connected for common rotation with first interconnecting shaft 22. Gear 82 intermeshes with idler gear 86. Idler gear 86 is rotatable about idler axis I and intermeshes with gear 84. Gear 84 is selectively connectable with countershaft 26. As shown in FIG. 1, gear set 80 is disposed adjacent wall 25 and provides a reverse gear ratio.

Gear set 90 includes co-planar, intermeshing gear 92 and gear 94. Gear 92 is connected for common rotation with first interconnecting shaft 22. Gear 92 intermeshes with gear 94. Gear 94 is selectively connectable for common rotation with countershaft 26. As shown in FIG. 1, gear set 90 is disposed adjacent gear set 80 and provides a second gear ratio.

Gear set 100 includes co-planar, intermeshing gear 102 and gear 104. Gear 102 is selectively connectable for common rotation with first interconnecting shaft 22. Gear 102 intermeshes with gear 104. Gear 104 is connected for common rotation with countershaft 26. As shown in FIG. 1, gear set 100 is disposed adjacent gear set 90 and provides a sixth gear ratio.

Gear set 110 includes co-planar, intermeshing gear 112 and gear 114. Gear 112 is selectively connectable for common rotation with first interconnecting shaft 22. Gear 112 intermeshes with gear 114. Gear 114 is connected for common rotation with countershaft 26. As shown in FIG. 1, gear set 110 is disposed adjacent gear set 100 and wall 27 and provides a fourth gear ratio.

The transmission 10 further includes a plurality of selectively engagable synchronizers 111, 113, 115, 116, 118, 120, 122 and 124. Synchronizers 111/113, 115/116, 118/120 and 122/124 are a left and right side of synchronizer assemblies, sharing a common synchronizer hub and sleeve. Synchronizer 111 is selectively engagable to connect gear 42 with second interconnecting shaft 24 for common rotation therewith. Synchronizer 113 is selectively engagable to connect gear 52 with second interconnecting shaft 24 for common rotation therewith. Synchronizer 115 is selectively engagable to connect gear 64 with countershaft 26 for common rotation therewith. Synchronizer 116 is selectively engagable to connect gear 74 with countershaft 26 for common rotation therewith. Synchronizer 118 is selectively engagable to connect gear 84 with countershaft 26 for common rotation therewith. Synchronizer 120 is selectively engagable to connect gear 94 with countershaft 26 for common rotation therewith. Synchronizer 122 is selectively engagable to connect gear 102 with first interconnecting shaft 22 for common rotation therewith. Synchronizer 124 is selectively engagable to connect gear 112 with first interconnecting shaft 22 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 111, 113, 115, 116, 118, 120, 122 and 124. Those skilled in the art will readily understand that a different speed ratio is associated with each torque ratio.

To establish the reverse torque ratio clutch element 34 of the dual clutch 30 and synchronizer 118 are engaged. By the engagement of clutch element 34 of the dual clutch 30, torque is transferred from the input shaft 12 through clutch housing 32 to the first interconnecting shaft 22. Further, torque is transferred from the first interconnecting shaft 22 through gear 82 to idler gear 86. Idler gear 86 transfers the torque to gear 84. Upon engagement of synchronizer 118, gear 84 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A first forward torque ratio (1st gear) is achieved by engaging clutch element 36 of the dual clutch 30 and synchronizer 116. By the engagement of clutch element 36 of the dual clutch 30, torque is transferred from input shaft 12 through clutch housing 32 to the second interconnecting shaft 24. Further, torque is transferred from the second interconnecting shaft 24 to gear 72. Gear 72 transfers the torque to gear 74. Upon engagement of synchronizer 116, gear 74 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A subsequent forward torque ratio (2nd gear) is established by engagement of clutch element 34 of the dual clutch 30 and synchronizer 120. By the engagement of clutch element 34 of the dual clutch 30, torque is transferred from input shaft 12 through clutch housing 32 to the first interconnecting shaft 22. Further, torque is transferred from the first interconnecting shaft 22 to gear 92. Gear 92 transfers the torque to gear 94. Upon engagement of synchronizer 120, gear 94 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A subsequent torque ratio (3rd gear) is established by engagement of clutch element 36 of the dual clutch 30 and synchronizer 113. By the engagement of clutch element 36 of the dual clutch 30, torque is transferred from input shaft 12 through clutch housing 32 to the second interconnecting shaft 24. Upon engagement of synchronizer 113, torque is transferred from the second interconnecting shaft 24 to gear 52. Gear 52 transfers the torque to gear 54. Gear 54 transfers torque to gear 56, which in turn transfers the torque to output shaft 14. Output shaft 14 transfers the torque to the final drive unit 18.

A next subsequent forward torque ratio (4th gear) is established by engagement of clutch element 34 of the dual clutch 30 and synchronizer 124. By the engagement of clutch element 34 of the dual clutch 30, torque is transferred from input shaft 12 through clutch housing 32 to the first interconnecting shaft 22. Upon engagement of synchronizer 124, torque is transferred from the first interconnecting shaft 22 to gear 112. Gear 112 transfers the torque to gear 114. Gear 114 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A subsequent torque ratio (5th gear) is established by engagement of clutch element 36 of the dual clutch 30 and synchronizer 115. By the engagement of clutch element 36 of the dual clutch 30, torque is transferred from input shaft 12 through clutch housing 32 to the second interconnecting shaft 24. Further, torque is transferred from the second interconnecting shaft 24 to gear 62. Gear 62 transfers the torque to gear 64. Upon engagement of synchronizer 115, gear 64 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A subsequent forward torque ratio (6th gear) is established by engagement of clutch element 34 of the dual clutch 30 and synchronizer 122. By the engagement of clutch element 34 of the dual clutch 30, torque is transferred from input shaft 12 through clutch housing 32 to the first interconnecting shaft 22. Upon engagement of synchronizer 122, torque is transferred from the first interconnecting shaft 22 to gear 102. Gear 102 transfers the torque to gear 104. Gear 104 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

A subsequent torque ratio (7th gear) is established by engagement of clutch element 36 of the dual clutch 30 and synchronizer 111. By the engagement of clutch element 36 of the dual clutch 30, torque is transferred from input shaft 12 through clutch housing 32 to the second interconnecting shaft 24. Upon engagement of synchronizer 111, torque is transferred from the second interconnecting shaft 24 to gear 42. Gear 42 transfers the torque to gear 44. Gear 44 transfers torque to countershaft 26. Countershaft 26 transfers the torque to gear 54. Gear 54 transfers torque to gear 56, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, gear 54 has dual functions: first, it is a driving transfer gear, and second, it is also a driven gear (pinion) in gear set 50. This arrangement provides flexibility to achieve desired gears ratios and gears steps. Further, the present invention contemplates that transfer gears can be driven of off the 1st, 2nd, 6th, and 7th gear sets based on the desired gear ratios and available packaging envelope in the transmission case. Finally, an overall transmission length reduction is achieved by, firstly, placing the transfer gears in one plane (two gears only) and, secondly, providing the reverse idler gear as a single gear (resulting in a one plane design).

Figure 2:
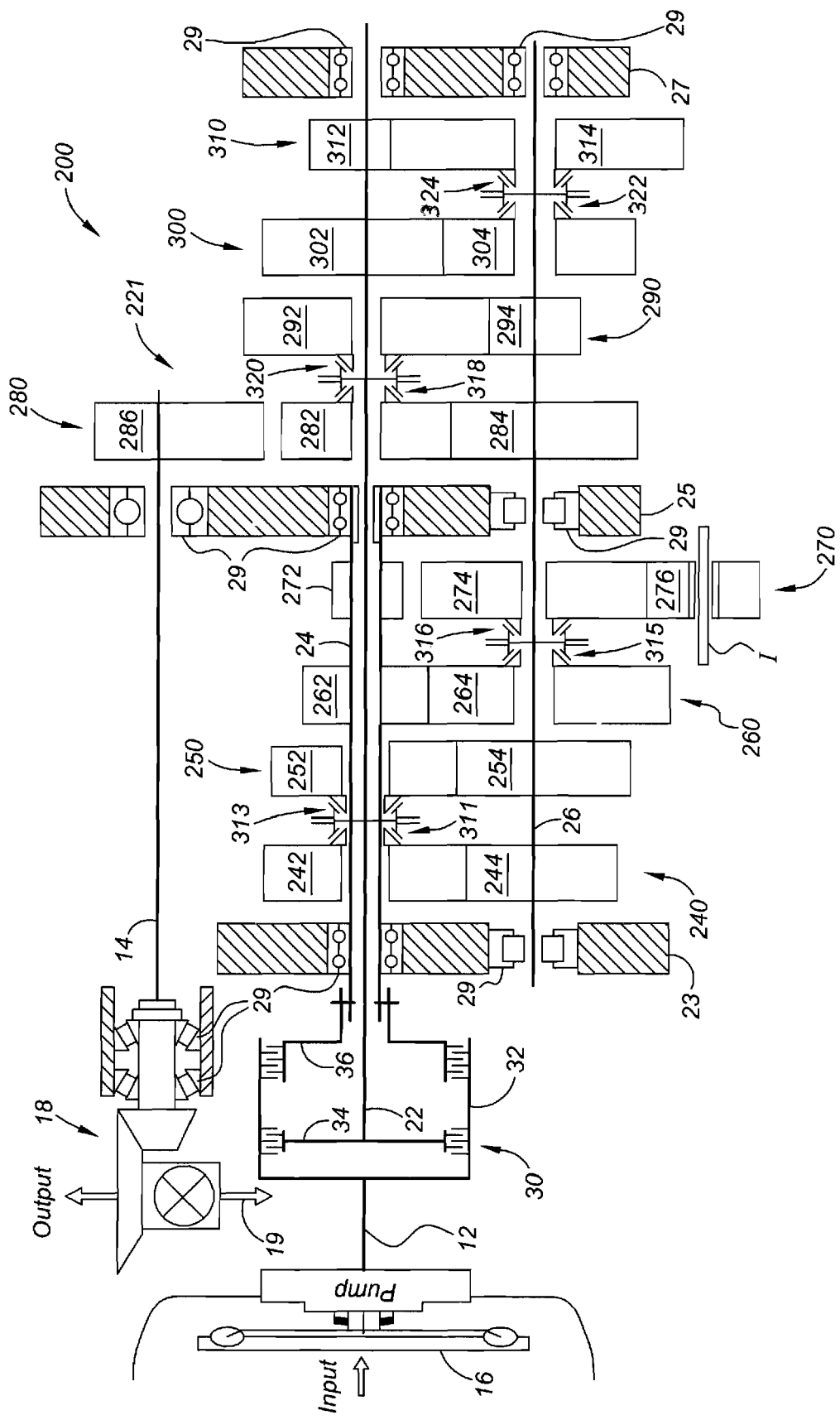
FIG. 2 is a diagram of another embodiment of a multiple speed transmission according to the principles of the present invention.

Referring now to FIG. 2, an alternate embodiment of the present invention is illustrated as a multi-speed transmission 200. The transmission 200 includes an input member 12 and an output member 14. In this embodiment, the input member 12 and the output member 14 are shafts, however it should be appreciated that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The final drive unit 18 includes a final drive unit output shaft 19 that is transverse to input member 12. The transmission 200 includes a countershaft gearing arrangement 21 that includes interconnecting shafts, a countershaft, co-planar intermeshing gear sets and selectively engageable synchronizers, as will be described herein. For example, the countershaft gearing arrangement 21 includes a first interconnecting shaft 22 and a second interconnecting shaft 24, which is a sleeve shaft concentric with the first interconnecting shaft 22. The countershaft gearing arrangement 21 further includes a countershaft 26. The countershaft 26 is both spaced from and parallel with the input shaft 12, the output shaft 14 and the interconnecting shafts 22, 24.

The first and second interconnecting shafts 22, 24, countershaft 26 and output shaft 14 are supported by a first, second and third support structure or wall 23, 25, 27 formed in the housing of transmission 200. As conventionally known, the walls 23, 25, 27 are fitted with bearings 29 for rotatably supporting the first and second interconnecting shafts 22, 24, countershaft 26 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second interconnecting shafts 22, 24 and is located adjacent output shaft 19. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32, connects the input shaft 12 for common rotation with first interconnecting shaft 22 and selective engagement of clutch element 36 with clutch housing 32, connects the input shaft 12 for common rotation with second interconnecting shaft 24.

The countershaft gearing arrangement 21 includes co-planar, intermeshing gear sets 240, 250, 260, 270, 280, 290, 300 and 3 10. Gear set 240 includes co-planar gears 242 and 244. Gear 242 is selectively connectable for common rotation with second interconnecting shaft 24 and intermeshes with gear 244. Gear 244 is connected for common rotation with countershaft 26. As shown in FIG. 2, gear set 240 is disposed adjacent wall 23 and provides a sixth gear ratio.

Gear set 250 includes co-planar, intermeshing gear 252 and gear 254. Gear 252 is selectively connectable for common rotation with second interconnecting shaft 24 and intermeshes with gear 254. Gear 254 is connected for common rotation with countershaft 26. As shown in FIG. 2, gear set 250 is disposed adjacent gear set 240 and provides a fourth gear ratio.

Gear set 260 includes co-planar, intermeshing gears 262 and 264. Gear 262 is connected for common rotation with second interconnecting shaft 24 and intermeshes with gear 264. Gear 264 is selectively connectable for common rotation with countershaft 26. As shown in FIG. 2, gear set 260 is disposed adjacent gear set 250 and provides a second gear ratio.

Gear set 270 includes co-planar, intermeshing gears 272, 274 and idler gear 276. Gear 272 is connected for common rotation with second interconnecting shaft 24 and intermeshes with idler gear 276. Idler gear 276 is rotatable about idler axis I and intermeshes with gear 274. Gear 274 is selectively connectable with countershaft 26. As shown in FIG. 2, gear set 270 is disposed adjacent gear set 260 and wall 25 and provides a reverse gear ratio.

Gear set 280 includes co-planar, intermeshing gears 282, 284 and 286. Gear 282 is selectively connectable for common rotation with first interconnecting shaft 22 and intermeshes with gear 284. Gear 284 is connected for common rotation with countershaft 26 and intermeshes with gear 286. Gear 286 is connected for common rotation with output shaft 14. Gears 284 and 286 are called transfer gears. As shown in FIG. 2, gear set 280 is disposed adjacent wall 25 and provides a third gear ratio.

Gear set 290 includes co-planar, intermeshing gears 292 and 294. Gear 292 is selectively connectable for common rotation with first interconnecting shaft 22. Gear 292 intermeshes with gear 294. Gear 294 is connected for common rotation with countershaft 26. As shown in FIG. 2, gear set 290 is disposed adjacent gear set 280 and provides a seventh gear ratio.

Gear set 300 includes co-planar, intermeshing gears 302 and 304. Gear 302 is connected for common rotation with first interconnecting shaft 22. Gear 302 intermeshes with gear 304. Gear 304 is selectively connectable for common rotation with countershaft 26. As shown in FIG. 2, gear set 300 is disposed adjacent gear set 290 and provides a fifth gear ratio.

Gear set 310 includes co-planar, intermeshing gears 312 and 314. Gear 312 is connected for common rotation with first interconnecting shaft 22. Gear 312 intermeshes with gear 314. Gear 314 is selectively connectable for common rotation with countershaft 26. As shown in FIG. 2, gear set 310 is disposed adjacent gear set 300 and wall 27 and provides a first gear ratio.

The transmission 200 further includes a plurality of selectively engagable synchronizers 311, 313, 315, 316, 318, 320, 322 and 324. Synchronizers 311/313, 315/316, 318/320 and 322/324 are a left and right side of synchronizer assemblies, sharing a common synchronizer hub and sleeve. Synchronizer 311 is selectively engagable to connect gear 242 with second interconnecting shaft 24 for common rotation therewith. Synchronizer 313 is selectively engagable to connect gear 252 with second interconnecting shaft 24 for common rotation therewith. Synchronizer 315 is selectively engagable to connect gear 264 with countershaft 26 for common rotation therewith. Synchronizer 316 is selectively engagable to connect gear 274 with countershaft 26 for common rotation therewith. Synchronizer 318 is selectively engagable to connect gear 282 with first interconnecting shaft 22 for common rotation therewith. Synchronizer 320 is selectively engagable to connect gear 292 with first interconnecting shaft 22 for common rotation therewith. Synchronizer 322 is selectively engagable to connect gear 304 with countershaft 26 for common rotation therewith. Synchronizer 324 is selectively engagable to connect gear 314 with countershaft 26 for common rotation therewith.

The transmission 200 is capable of transmitting torque from the input shaft 12 to the output shaft 14 in at least seven forward torque ratios and one reverse torque ratio, as indicated in FIG. 2. Each of the forward torque ratios and the reverse torque ratio is attained by engagement of dual clutch 30 and one of the clutch elements 34, 36 and one or more of the synchronizers 311, 313, 315, 316, 318, 320, 322 and 324. Those skilled in the art will readily understand that a different speed ratio is associated with each torque ratio and how these torque or speed ratios are achieved, based on the description of transmission 10 above.

The present invention contemplates that a variety of torque ratios (i.e., the ratio of torque of the output member 14 to the input member 12) are achievable through the selection of tooth counts of the gears of the transmission 200. Moreover, the present invention advantageously provides the transfer gear 286 driven by transfer gear 284. Gear 284 has dual functions: first, it is a driving transfer gear, and second it is a driven gear (pinion) in the gear set 280. This arrangement provides flexibility to achieve desired gears ratios and gears steps. Further, the present invention contemplates that transfer gears can be driven of off the 1st, 2nd, 6th, and 7th gear sets based on the desired gear ratios and available packaging envelope in the transmission case. Finally, an overall transmission length reduction is achieved by, firstly, placing the transfer gears in one plane (two gears only) and, secondly, providing the reverse idler gear as a single gear (resulting in a one plane design).

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member;
an output member;
a first, second, third, fourth, fifth, sixth, seventh, and eighth gear set each having a first gear and a second gear, wherein the output member is directly, continuously intermeshed with one of the gear sets;
a first interconnecting member continuously connected to the fifth and sixth gear sets;
a second interconnecting member continuously connected with the third and fourth gear sets;
a countershaft continuously connected to the first, second, seventh, and eighth gear sets;
a dual clutch assembly selectively engageable to interconnect the input member with one of the first interconnecting member and the second interconnecting member; and
four synchronizer assemblies each for selectively coupling one of the first, second, third, fourth, fifth, sixth, seventh, and eighth gear sets with one of the first interconnecting member, second interconnecting member, and the countershaft, and
wherein the dual clutch assembly and four synchronizer assemblies are selectively engageable in combinations of at least two to establish at least seven forward speed ratios and at least one reverse speed ratio between the input member and the output member.

2. The transmission of claim 1 wherein the countershaft is located radially outward from and parallel to the input member.

3. The transmission of claim 2 wherein the output member is located radially outward from and parallel to the input member.

4. The transmission of claim 3 wherein the first interconnecting member is concentric with the second interconnecting member.

5. The transmission of claim 4 further comprising a torque converter connected with the input member and a transfer case connected with the output member, wherein the transfer case is connected to a transfer case output member located between the torque converter and the dual clutch assembly.

6. The transmission of claim 1 wherein the dual clutch assembly includes a first clutch for selectively connecting the input member with the first interconnecting member and a second clutch for selectively connecting the input member with the second interconnecting member.

7. The transmission of claim 1 wherein the output member is continuously connected with the second gear set.

8. The transmission of claim 1 wherein the first gear and second gear within each of the first, second, third, fourth, fifth, sixth, seventh, and eighth gear sets are radially aligned.

9. The transmission of claim 8 wherein the fifth gear set includes a third gear rotatable about an axis radially outward from and parallel to the countershaft, and wherein the third gear is intermeshed with the first gear and the second gear of the fifth gear set.

10. The transmission of claim 9 wherein the second gear set includes a third gear continuously connected to the output member.

11. The transmission of claim 10 wherein the first, second, and third gears of the second and fifth gear sets, respectively, are radially aligned.

12. The transmission of claim 1 wherein a first of the four synchronizer assemblies selectively connects one of the first gear set and the second gear set to the second interconnecting member.

13. The transmission of claim 12 wherein a second of the four synchronizer assemblies selectively connects one of the third gear set and the fourth gear set to the countershaft.

14. The transmission of claim 13 wherein a third of the four synchronizer assemblies selectively connects one of the fifth gear set and the sixth gear set to the countershaft.

15. The transmission of claim 14 wherein a fourth of the four synchronizer assemblies selectively connects one of the seventh gear set and the eighth gear set to the first interconnecting member.

16. The transmission of claim 1 wherein the first gears are connectable with a least one of the first interconnecting member and the second interconnecting member and wherein the second gears are connectable with the countershaft.

17. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set.

18. A transmission comprising:
an input member;
an output member;
a first, second, third, fourth, fifth, sixth, seventh, and eighth gear set each having a first gear and a second gear, wherein the output member is directly, continuously intermeshed with the second gear set;
a first interconnecting member continuously connected to the fifth and sixth gear sets;
a second interconnecting member continuously connected with the third and fourth gear sets;
a countershaft continuously connected to the first, second, seventh, and eighth gear sets;
a dual clutch assembly having a first clutch for selectively connecting the input member with the first interconnecting member and a second clutch for selectively connecting the input member with the second interconnecting member;
a first synchronizer assembly for selectively connecting one of the first gear set and the second gear set to the second interconnecting member;
a second synchronizer assembly for selectively connecting one of the third gear set and the fourth gear set to the countershaft;
a third synchronizer assembly for selectively connecting one of the fifth gear set and the sixth gear set to the countershaft; and
a fourth synchronizer assembly for selectively connecting one of the seventh gear set and the eighth gear set to the first interconnecting member,
wherein the dual clutch assembly and four synchronizer assemblies are selectively engageable in combinations of at least two to establish at least seven forward speed ratios and at least one reverse speed ratio between the input member and the output member.

19. The transmission of claim 18 wherein the first gear and second gear within each of the first, second, third, fourth, fifth, sixth, seventh, and eighth gear sets are radially aligned.

20. The transmission of claim 19 wherein the fifth gear set includes a third gear rotatable about an axis radially outward from and parallel to the countershaft, the third gear intermeshed with the first gear and the second gear of the fifth gear set, wherein the second gear set includes a third gear continuously connected to the output member and intermeshed with the second gear of the second gear set, and wherein the first, second, and third gears of the second and fifth gear sets, respectively, are radially aligned.

21. The transmission of claim 20 wherein the first gears are connectable with at least one of the first interconnecting member and the second interconnecting member and wherein the second gears are connectable with the countershaft.

22. The transmission of claim 21 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set.

* * * * *